United States Patent
Tsai et al.

(10) Patent No.: US 8,719,868 B2
(45) Date of Patent: May 6, 2014

(54) PRESENTATION OF COMBINED VIDEO SIGNALS FROM MULTIPLE SOURCES

(75) Inventors: Leonard Tsai, Mountain View, CA (US); Alexander Thatcher, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 12/921,153

(22) PCT Filed: Mar. 5, 2008

(86) PCT No.: PCT/US2008/055929
§ 371 (c)(1),
(2), (4) Date: Sep. 5, 2010

(87) PCT Pub. No.: WO2009/110897
PCT Pub. Date: Sep. 11, 2009

(65) Prior Publication Data
US 2011/0023064 A1     Jan. 27, 2011

(51) Int. Cl.
*G06F 3/00* (2006.01)
*G06F 13/00* (2006.01)
*H04N 5/445* (2011.01)
*H04N 5/04* (2006.01)
*H04N 5/45* (2011.01)
*H04N 9/74* (2006.01)
*H04J 3/02* (2006.01)
*H04N 11/02* (2006.01)

(52) U.S. Cl.
USPC .................. 725/48; 725/40; 725/43; 725/53; 725/59; 348/500; 348/563; 348/564; 348/565; 348/584; 370/537; 375/240.28

(58) Field of Classification Search
USPC ............ 725/48, 40, 43, 53, 59; 348/500, 563, 348/564, 565, 584; 370/537; 375/240.28
See application file for complete search history.

(56) References Cited

U.S. PATENT DOCUMENTS 6,466,275 B1 * 10/2002 Honey et al. .................. 348/722
6,493,038 B1   12/2002 Singh et al.
(Continued)

FOREIGN PATENT DOCUMENTS

CN     1389065 A     1/2003
CN     1543212 A     11/2004
(Continued)

OTHER PUBLICATIONS

Leonard Tsai et al., First Office Action dated Dec. 12, 2011, UK App No. 1015467.2, filed Aug. 24, 2010.
(Continued)

*Primary Examiner* — Hoang-Vu A Nguyen-Ba

(57) ABSTRACT

In one embodiment, a system comprises at least a first video source device, at least a first remote control device, a digital display device comprising logic to receive, in a digital display device, a first video signal from a first video source, extract at least a first metadata from the first video signal, use the first metadata to obtain a second video signal from a second video source, present the first video signal on the digital display device, combine at least a portion of the second video signal and at least a portion of the first video signal to generate a combined video signal, and present the combined video signal on a display.

17 Claims, 4 Drawing Sheets

(56) References Cited

U.S. PATENT DOCUMENTS

| | | |
|---|---|---|
| 6,868,525 B1 | 3/2005 | Szabo |
| 7,028,327 B1 | 4/2006 | Dougherty et al. |
| 7,119,849 B2 | 10/2006 | Yui et al. |
| 7,260,147 B2 | 8/2007 | Gordon et al. |
| 7,271,780 B2 | 9/2007 | Cok |
| 7,277,870 B2 | 10/2007 | Mourad et al. |
| 8,046,795 B2 * | 10/2011 | Nguyen .................. 725/43 |
| 2002/0054062 A1 | 5/2002 | Gerba et al. |
| 2003/0135464 A1 | 7/2003 | Mourad et al. |
| 2004/0113929 A1 | 6/2004 | Matsuzaki |
| 2005/0253869 A1 | 11/2005 | Sloo et al. |
| 2006/0288023 A1 | 12/2006 | Szabo |
| 2007/0136755 A1 * | 6/2007 | Sakai .................. 725/46 |
| 2007/0240232 A1 | 10/2007 | Pino |
| 2007/0250863 A1 | 10/2007 | Ferguson |

FOREIGN PATENT DOCUMENTS

| | | | |
|---|---|---|---|
| CN | 859565 A | 11/2006 | |
| CN | 101076089 A | 11/2007 | |
| CN | 101500125 A | 8/2009 | |
| KR | 10-2004-0074623 A | 8/2004 | |
| KR | 10-20080005180 A | 1/2008 | |
| WO | WO 98/53611 | * 11/1998 | ............ H04N 7/173 |
| WO | WO-2007009876 | 1/2007 | |

OTHER PUBLICATIONS

Chinese Patent Application for Invention No. 200880127835.6 (PCT/US2008/055929), office action dated Oct. 23, 2012.

* cited by examiner

PRESENTATION OF COMBINED VIDEO SIGNALS FROM MULTIPLE SOURCES

BACKGROUND

Conventional display devices or digital television may be receive, process, and display content from a video source such as, e.g., a broadcast television signal, a cable channel, a satellite channel or the like. Due to advances in bandwidth and in processing capabilities of display devices display devices that can integrate video input from multiple sources may find utility, especially when combined related information or contents together to provide enhanced user experience.

BRIEF DESCRIPTION OF THE DRAWINGS

FIG. 2 is a schematic illustration of a digital entertainment environment.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Some of the embodiments discussed herein may provide techniques for synchronizing and windowing external content in digital display systems. Such techniques may enable a digital display device such as, e.g., a digital television, to integrate inputs from multiple video sources such as, e.g., a digital video disk (DVD) player, a personal computer, or a home storage server and an external input source such as, e.g., a remote video portal such that the integrated inputs can be presented seamless on a single display device.

Figure 1:
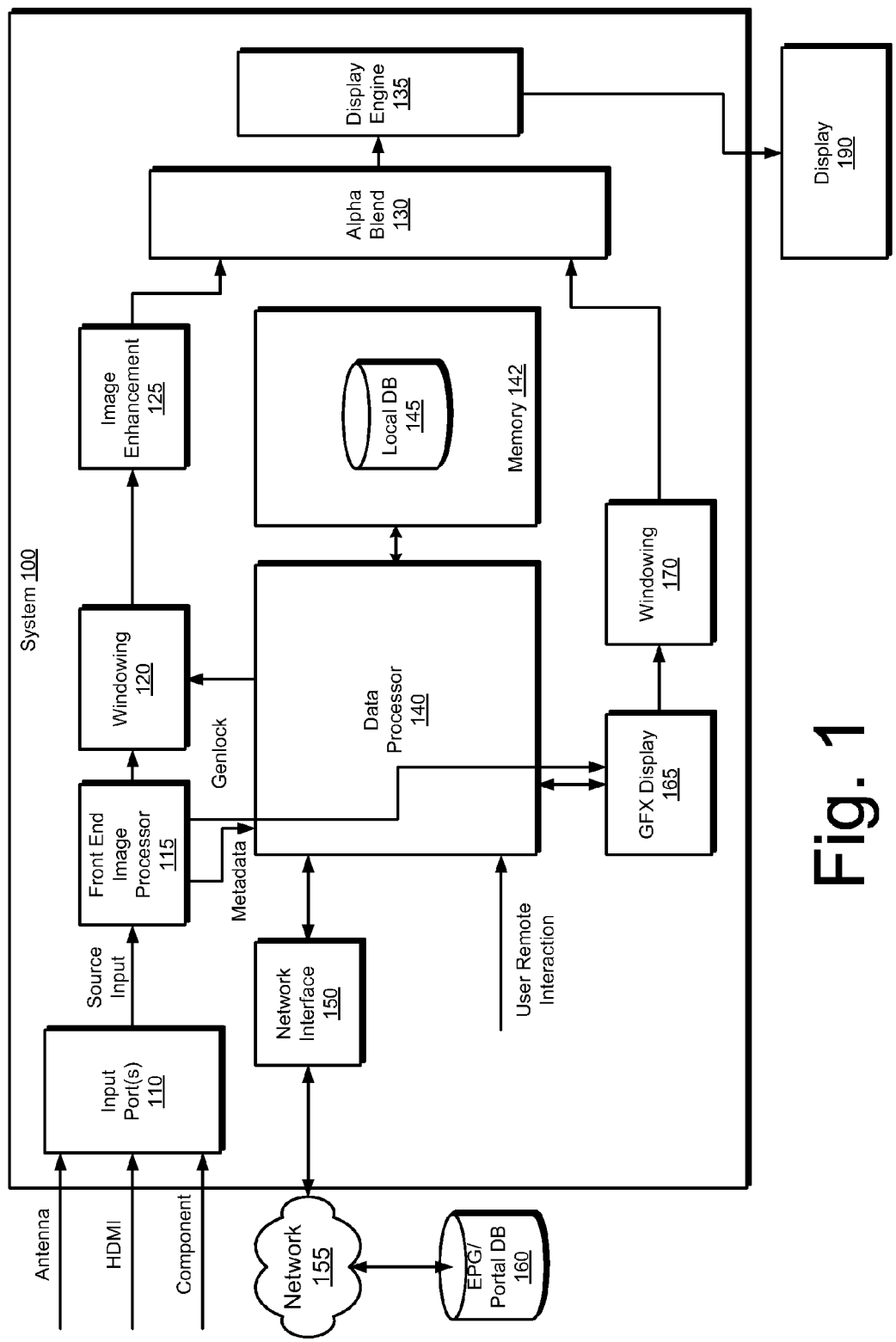
FIGS. 1-2 is a schematic illustration of a display system architecture in accordance with some embodiments.

In some embodiments, a system for synchronizing and windowing external content in digital display systems may be implemented as a digital television, a computer system, or other digital rendering system. FIG. 1 is a schematic illustration of a display system 100 in accordance with one embodiment. Referring to FIG. 1, the system 100 comprises at least one, an in practice a plurality, of input ports 110 by which display device 100 may be coupled to multiple source devices such as, e.g., e.g., an antenna, a digital video disk (DVD) player, a personal computer, or a home storage server, or the like by a communication connection such as, e.g., a High-Definition Multimedia Interface (HDMI) connection, an RF (coaxial cable) connection, a composite video connection, an S-video connection, a VGA connection, or the like. In some embodiments, the input may be an internet protocol (IP) television (IPTV) signal.

System 100 further comprises a front end image processor 115 which provides initial processing of the source input from the input port 110 and a windowing module 120 which scales the video input to an appropriate size to fit on a display 190 coupled to system 100. In addition, system 100 may comprise an image enhancement module 125 which applies one or more image enhancement techniques such as, e.g., color enhancement, white balancing, edge enhancement, etc., to the video stream.

System 100 further comprises a data processor 140. In some embodiments, data processor 140 may be a conventional computer processor, a configurable processor such as, for example, a field programmable gate array (FPGA), or a processor specifically designed for distribution system 110, for example, an application specific integrated circuit (ASIC). Processor 140 may include, or be coupled to a video processor.

Data processor 140 is coupled to a network interface 150 which provides a connection to a network 155. In some embodiments network 155 may be embodied as a public communication network such as, e.g., the Internet. In alternate embodiments, network 155 may be implemented as a private network such as, e.g., a cable network or the like. Network 155 provides access to an electronic programming guide (EPG) which maintains a portal database 160 of content which may be displayed by system 100 on display 190. For example, portal database 160 may comprise advertising content, image content, information content, or interactive content, or the like.

System 100 further comprises a graphics display module 165 coupled to the data processor 140. Output from the graphics display module 165 is directed to a windowing module 170 which scales the video input to an appropriate size to fit on a display 190 coupled to system 100.

System 100 further comprises a memory module 142 which may comprise active memory such as, RAM, and may comprise one or more persistent storage media, for example one or more hard disk drives, optical drives, tape disk drives, flash memories, or the like. In the embodiment depicted in FIG. 1, memory module comprises a local database 145. In some embodiments, local database 145 may used to store user preferences. For example, a user may prefer to have the second set of information only at the top of the screen. In addition, the local database 145 may be used to reduce the amount of download required over network.

System 100 further comprises a mixer such as, e.g., an alpha blender module 130 which overlays output from windowing module 170 onto output from image enhancement module 125, such that a output from windowing module 170 may be displayed contemporaneously with output from image enhancement module 125 on a video screen. Output from the alpha blend module is input to a display engine, which in turn generates an output for display on a display module 190.

Figure 2:
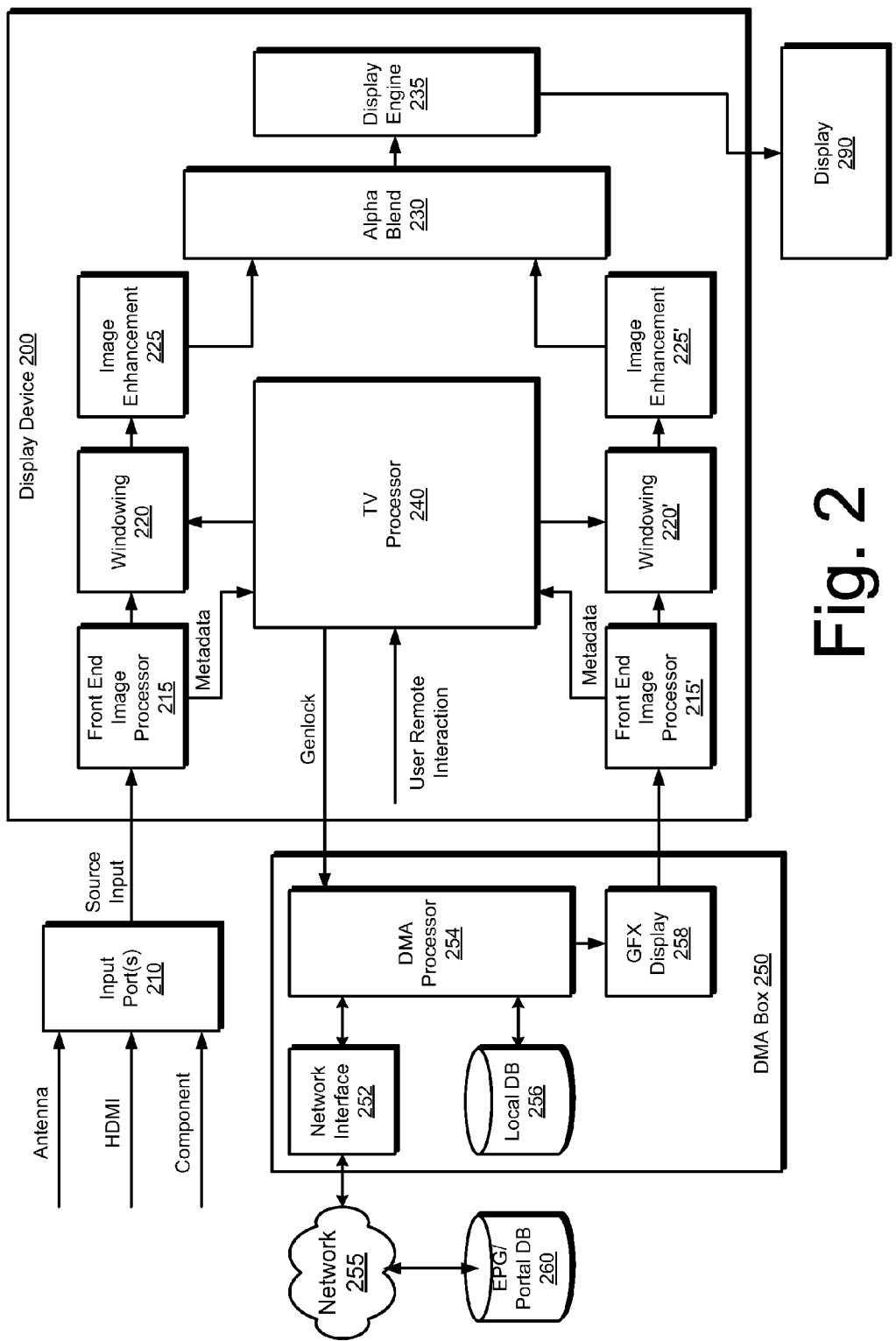

In some embodiments, a system for synchronizing and windowing external content in digital display systems may be implemented as a digital media appliance (DMA) box, which may be coupled to a display system such as a digital television. FIG. 2 is a schematic illustration of a system 200 in accordance with one embodiment.

Referring to FIG. 2, the system comprises at least one, an in practice a plurality, of input ports 210 by which display device 200 may be coupled to multiple source devices such as, e.g., e.g., an antenna, a digital video disk (DVD) player, a personal computer, or a home storage server, or the like by a communication connection such as, e.g., a High-Definition Multimedia Interface (HDMI) connection, an RF (coaxial cable) connection, a composite video connection, an S-video connection, a VGA connection, or the like. In some embodiments, the input may be an internet protocol (IP) television signal.

Display device 200 further comprises a front end image processor 215 which provides initial processing of the source input from the input port 110 and a windowing module 220 which scales the video input to an appropriate size to fit on a display 290 coupled to display device 200. In addition, display device 200 may comprise an image enhancement module 225 which applies one or more image enhancement techniques such as, e.g., color enhancement, white balancing, edge enhancement, etc., to the video stream.

System 100 further comprises a TV signal processor 140. In some embodiments, data processor 140 may be a conventional computer processor, a configurable processor such as, for example, a field programmable gate array (FPGA), or a processor specifically designed for display device 200, for example, an application specific integrated circuit (ASIC). Processor 240 may include, or be coupled to a video processor.

TV processor 140 is coupled to a digital media appliance (DMA) box 250, and to a DMA processor 254 in DMA box 250. DMA 250 further comprises a network interface 252, which provides access to a network 255. In some embodiments network 255 may be embodied as a public communication network such as, e.g., the Internet. In alternate embodiments, network 255 may be implemented as a private network such as, e.g., a cable network or the like. Network 255 provides access to an electronic programming guide (EPG) which maintains a portal database 260 of content which may be displayed by display device 200 on display 290. For example, portal database 260 may comprise advertising content, image content, information content, or interactive content, or the like.

DMA box 250 further comprises a local database 256, which may be stored in active memory such as, RAM, and may comprise one or more persistent storage media, for example one or more hard disk drives, optical drives, tape disk drives, or the like.

DMA box 250 further comprises a graphics display module 258 coupled to the DMA processor 254. In one embodiment, output from the graphics display module 256 is directed to a front-end image processing module 215' in the display device 200. Output from the front-end image processing module 215' is input to a windowing module 220' which scales the video input to an appropriate size to fit on a display 190 coupled to system 100. Output from windowing module 220' is input to an image enhancement module 225' which applies one or more image enhancement techniques such as, e.g., color enhancement, white balancing, edge enhancement, etc., to the video stream.

Display device 200 further comprises a mixer such as, e.g., an alpha blender module 230 which overlays output from image enhancement module 225' onto output from image enhancement module 225, such that a output from image enhancement module 225' may be displayed contemporaneously with output from image enhancement module 125 on a video screen. Output from the alpha blend module is input to a display engine, which in turn generates an output for display on a display module 290.

Figure 3:
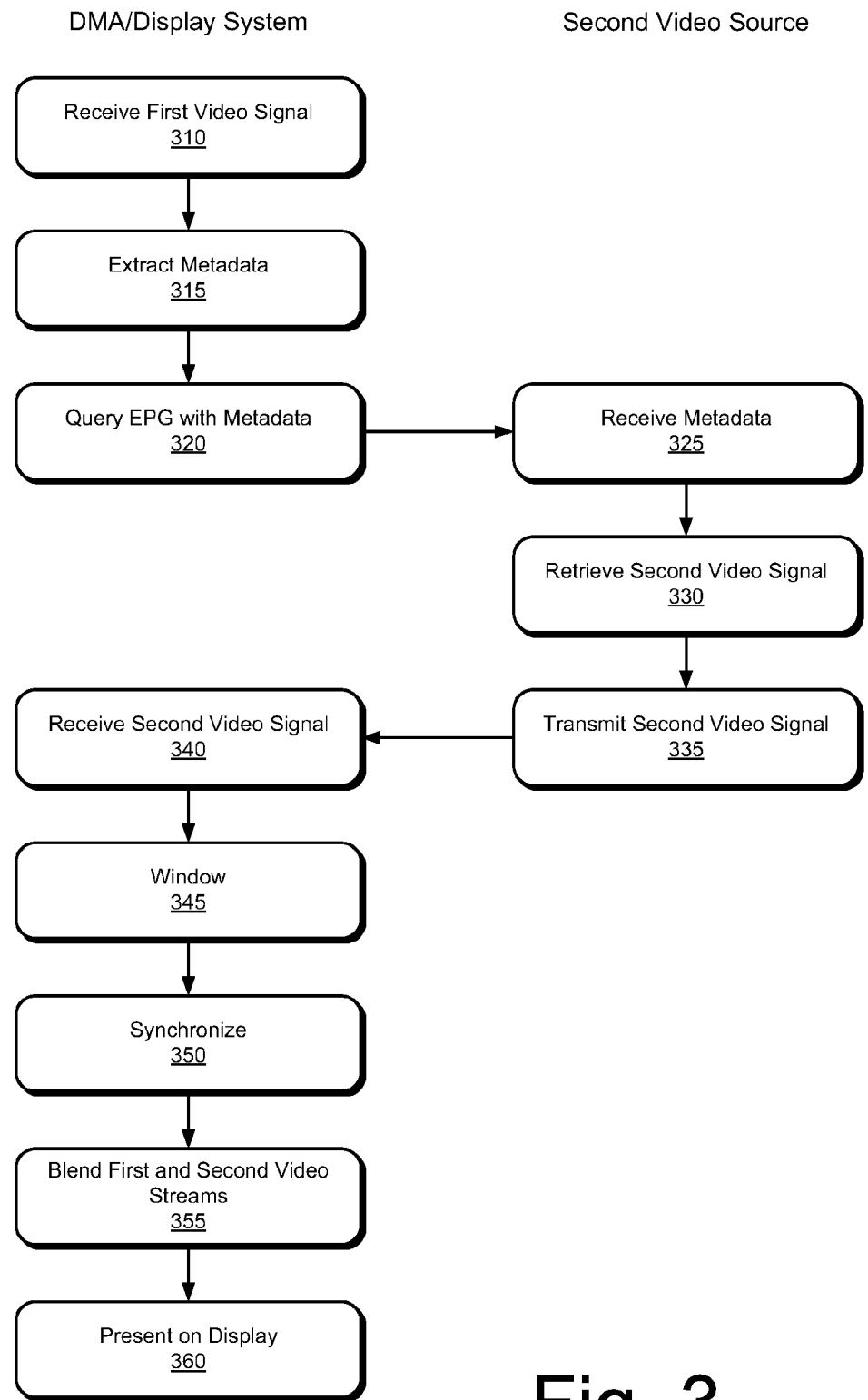
FIG. 3 is a flowchart illustrating operations in a methods for synchronizing and windowing external content in digital display systems, in accordance with some embodiments.

FIG. 3 is a flowchart illustrating operations in a method for synchronizing and windowing external content in digital display systems, in accordance with some embodiments. In the embodiment depicted in FIG. 1, the operations in the left-hand column of FIG. 3 may be implemented by the system 100 and the operations in the right-hand column of FIG. 3 may be implemented by a remote video source such as, e.g., the portal database 160. In the embodiment depicted in FIG. 2, the operations in the left-hand column of FIG. 3 may be implemented by the DMA box 250 and the display device 200 and the operations in the right-hand column of FIG. 3 may be implemented by a remote video source such as, e.g., the portal database 160.

Referring now to FIG. 3, at operation 310 a first video signal is received from a first video source. For example, the first video signal may be an IPTV signal input from an antenna, HDMI input or a component input. In some embodiments the IPTV signal comprises metadata that uniquely identifies the video signal stream. For example, the metadata may comprise an identifier that uniquely identifies the video content of the video stream as a specific program, music video, or the like. In addition, the metadata may comprise identify specific scenes in a program, music associated with the program, actors, or locations of scenes in a program.

At operation 315 the metadata is extracted from the IPTV video data stream. For example, in the embodiment depicted in FIG. 1 the front-end image processor 115 extracts metadata from the source input from input port(s) 110 and forwards the metadata to the data processor 140. Similarly, in the embodiment depicted in FIG. 2 the front end image processor 215 extracts metadata from the source input from input port(s) 210 and forwards the metadata to the data processor 240.

At operation 320 the electronic programming guide (EPG) is queried with at least some of the metadata extracted from the video stream in operation 315. For example, in the embodiment depicted in FIG. 1 the data processor 140 launches a query to the EPG/Portal DB 160 via the network interface 155 and the communication network 155. Similarly, in the embodiment depicted in FIG. 2 the TV processor 240 passes the metadata to DMA processor 254, which launches a query to the EPG/Portal DB 260 via the network interface 255 and the communication network 255.

At operation 325 the second video source, i.e., the EPG receives the query comprising the metadata, and at operation 330 the EPG uses the metadata to retrieve a second video signal from the portal DB 260 using at least a portion of the metadata as a key to access the portal DB. For example, the portal DB 260 may include supplemental content such as, e.g., advertising, images, or the like, which may be displayed in conjunction with the first video stream. At operation 335 the second video source returns the second video signal to the requesting entity.

At operation 340 the second video signal is received in the requesting entity. For example, in the embodiment depicted in FIG. 1, the second video signal is received in the data processor 140 via the network interface 150. In the embodiment depicted in FIG. 2, the second video signal is received in the DMA processor 254 via network interface 252.

At operation 345 the second video signal is forwarded to a windowing module to be scaled for a display. For example, in the embodiment depicted in FIG. 1, the data processor 140 passes the second video signal to a graphics processor 165, which in turn forwards the second video signal to a windowing module 170. In the embodiment depicted in FIG. 2, the DMA processor 254 passes the second video signal to a graphics processor 258, which in turn forwards the second video signal to a front end image processor 215' and a windowing module 220'.

At operation 350 the second video signal is synchronized with the first video signal. One embodiment of a synchronization process is discussed with reference to FIG. 4, below. At operation 355 the first and second video streams are blended. For example, in the embodiment depicted in FIG. 1, the first and second video streams are blended by alpha blender 130. In the embodiment depicted in FIG. 2, the first and second video streams are blended by alpha blender 230.

At operation 360 the combined first and second video signals are presented on a display. For example, in the embodiment depicted in FIG. 1, the first and second video streams are blended by alpha blender 130. In the embodiment depicted in FIG. 2, the first and second video streams are blended by alpha blender 230.

In some embodiments, the operations of FIG. 3 may be implemented with multiple remote video sources. For example, metadata may be used to extract a second video signal from a second source, a third video signal from a third source, and so on.

In some embodiments the first video signal and the second video signal may have different frame rates. For example, many films are recorded using a progressive 24 Hz format, and television programming is recorded at a progressive 60 Hz format or an interlaced 30 Hz format. By contrast, the output form the graphics controllers 165, 258 will commonly be at 120 Hz. Thus, the first video signal and the second video signal need to be synchronized before presentation on the display screen.

Figure 4:
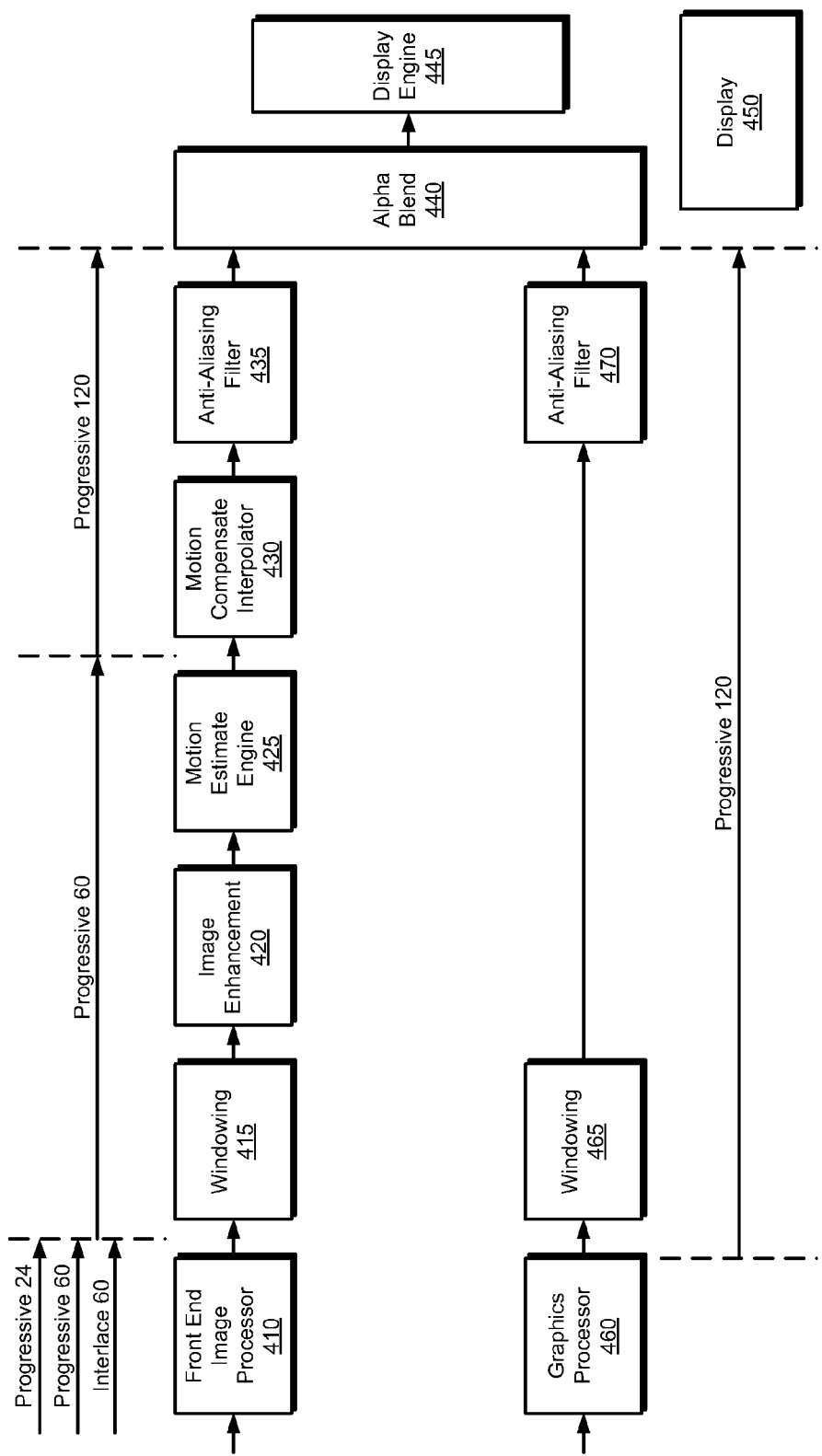
FIG. 4 is a schematic illustration of an arrangement to synchronize the first video stream and the second video stream, according to embodiments.

FIG. 4 is a schematic illustration of an arrangement to synchronize the first video stream and the second video stream, according to embodiments.

Referring to FIG. 4, the processing stream for the first video source is illustrated in the upper boxes of FIG. 4, while the processing stream for the second video source is illustrated in the lower boxes of FIG. 4. In operation, the second video stream is input to graphics processor 460, which generates an output in a progressive 120 Hz format. The output is applied to a windowing module 465 and an anti-aliasing filter 470 before being submitted to alpha blend module 440.

The first video signal is processed by a front end image processor 410, a windowing module 415, and an image enhancement module 420, the operations of which are described above with reference to FIGS. 1 and 2. The frame rate of the first video signal is can be maintained during processing by the front end image processor 410, a windowing module 415, and an image enhancement module 420. For example, if the first video signal is input in a progressive 60 format, the frame rate can remain in a progressive 60 format in these modules.

The output of the image enhancement module is input to a motion estimation engine 425 and a motion compensation interpolator 430, which adjusts the frame rate to match the progressive 120 Hz frame rate of the second video signal. For example, if the first video signal is input in a progressive 60 Hz format, then the frame rate can be doubled to match the progressive 120 Hz format of the second signal. The output is applied to a windowing module 465 and an anti-aliasing filter 435 before being submitted to alpha blend module. 440.

The alpha blend module 440 mixes the first and second video signals and presents the combined signal to a display engine 445, which presents the combined signal on a display 450.

Thus, described herein are exemplary systems and methods for synchronizing and windowing external content in digital display systems. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disks, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method, comprising:
   receiving, in a digital display device, a first video signal from a first video source;
   extracting at least a first metadata from the first video signal;
   presenting the first metadata to an electronic program guide;
   receiving a second video signal from the electronic programming guide;
   combining at least a portion of the second video signal and at least a portion of the first video signal to generate a combined video signal;
   presenting the combined video signal on a display;
   receiving an input signal from a user interface associated with the display, wherein the input signal identifies an object on the display;
   retrieving a second metadata associated with the object;
   initiating a query to the electronic program guide;
   presenting the second metadata to the electronic program guide; and
   receiving a third video signal from the electronic programming guide.

2. The method of claim 1, wherein receiving, in a digital display device, a first video signal from a first video source comprises receiving a digital video stream via an input/output connector on the digital display device.

3. The method of claim 1, wherein extracting at least a first metadata from the first video signal comprises extracting metadata that uniquely identifies the video stream.

4. The method of claim 1, wherein the first metadata is presented to the electronic program guide as part of a query.

5. The method of claim 4, wherein the electronic program guide:
   receives the query comprising the first metadata;
   uses the first metadata as a key to retrieve a second video signal from a memory module; and
   transmits the second video signal to the digital display device.

6. The method of claim 1, wherein combining at least a portion of the second video signal and at least a portion of the first video signal further comprises:
   windowing the second video signal;
   scaling the second video signal; and
   synchronizing the second video signal with the first video signal.

7. The method of claim 1, further comprising:
   combining at least a portion of the third video signal and at least a portion of the first video signal by:
   windowing the third video signal;
   scaling the third video signal; and
   synchronizing the third video signal with the first video signal.

8. A system, comprising:
   at least a first video source device;
   at least a first remote control device;
   a digital display device comprising logic to:
      receive, in a digital display device, a first video signal from a first video source;
      extract at least a first metadata from the first video signal;
      present the first metadata to an electronic program guide;
      receive a second video signal from the electronic programming guide;
      combine at least a portion of the second video signal and at least a portion of the first video signal to generate a combined video signal;
      present the combined video signal on a display;
      receive an input signal from a user interface associated with the display, wherein the input signal identifies an object on the display;
      retrieve a second metadata associated with the object;
      initiate a query to the electronic program guide;
      present the second metadata to the electronic program guide; and
      receive a third video signal from the electronic programming guide.

9. The system of claim 8, wherein the digital display device further comprises logic to receive a digital video stream via an input/output connector on the digital display device.

10. The system of claim 8, wherein the digital display device further comprises logic to extract metadata that uniquely identifies a video stream.

11. The system of claim 8, wherein the digital display device further comprises logic to:
   initiate a query to the electronic program guide, the logic to initiate the query including the logic to present the first metadata to the electronic program guide.

12. The system of claim 8, wherein the electronic programming guide comprises logic to:
   receive the query comprising the first metadata;
   use the first metadata as a key to retrieve a second video signal from a memory module; and
   transmit the second video signal to the digital display device.

13. The system of claim 8, wherein the digital display device further comprises logic to:
   window the second video signal;
   scale the second video signal; and
   synchronize the second video signal with the first video signal.

14. The system of claim 8, wherein the digital display device further comprises logic to:
   window the third video signal;
   scale the third video signal; and
   synchronize the third video signal with the first video signal.

15. A computer program product comprising logic instructions stored on a non-transitory computer-readable medium which, when executed by a processor, configure the processor to:
   receive, in a digital display device, a first video signal from a first video source;
   extract at least a first metadata from the first video signal;
   present the first metadata to an electronic program guide;
   receive a second video signal from the electronic programming guide;
   combine at least a portion of the second video signal and at least a portion of the first video signal to generate a combined video signal;
   present the combined video signal on a display;
   receive an input signal from a user interface associated with the display, wherein the input signal identifies an object on the display;
   retrieve a second metadata associated with the object;
   initiate a query to the electronic program guide;
   present the second metadata to the electronic program guide; and
   receive a third video signal from the electronic programming guide.

16. The computer program product of claim 15, further comprising logic instructions stored on a non-transitory computer-readable medium which, when executed by a processor, configure the processor to:
   initiate a query to the electronic program guide, wherein the logic instruction to initiate the query include the logic instructions to present the first metadata to the electronic program guide.

17. The computer program product of claim 15, further comprising logic instructions stored on a non-transitory computer-readable medium which, when executed by a processor, configure the processor to:
   window the third video signal;
   scale the third video signal; and
   synchronize the third video signal with the first video signal.

* * * * *